United States Patent [19]

Ohtake et al.

[11] Patent Number: 4,460,411

[45] Date of Patent: Jul. 17, 1984

[54] NITROCELLULOSE COMPOSITION AND PROCESS FOR PRODUCING THE SAME

[75] Inventors: Etsuo Ohtake, Kanagawa; Akihiko Higuchi, Himeji, both of Japan

[73] Assignee: Daicel Chemical Industries, Ltd., Osaka, Japan

[21] Appl. No.: 451,204

[22] PCT Filed: Apr. 1, 1982

[86] PCT No.: PCT/JP82/00091

§ 371 Date: Dec. 1, 1982

§ 102(e) Date: Dec. 1, 1982

[87] PCT Pub. No.: WO82/03399

PCT Pub. Date: Oct. 14, 1982

[30] Foreign Application Priority Data

Apr. 2, 1981 [JP] Japan ............................ 56/50200

[51] Int. Cl.³ .................. C08L 1/18; C08L 75/04; G11B 5/70
[52] U.S. Cl. .................... 106/183; 106/176; 106/191; 106/195; 106/187; 360/134; 149/96; 149/100; 524/31; 524/590; 536/35
[58] Field of Search ............. 536/35; 524/31, 590; 106/195, 176, 183, 191, 187; 149/96–100

[56] References Cited

U.S. PATENT DOCUMENTS

| | | | |
|---|---|---|---|
| 3,163,567 | 12/1964 | Silk | 149/96 |
| 3,280,746 | 10/1966 | Brown | 149/98 |
| 3,346,675 | 10/1967 | Sapiego | 149/96 |
| 3,671,515 | 6/1972 | Cox et al. | 106/195 |
| 3,702,271 | 11/1972 | Henderson et al. | 149/96 |
| 3,741,781 | 6/1973 | Plazanet et al. | 106/195 |
| 3,824,108 | 7/1974 | Stoetzer et al. | 106/195 |
| 3,861,932 | 1/1975 | Kabacoff et al. | 106/195 |
| 3,925,125 | 12/1975 | Cox et al. | 149/96 |
| 3,948,675 | 4/1976 | Rat et al. | 106/195 |
| 3,962,382 | 6/1976 | Johnson et al. | 149/96 |

OTHER PUBLICATIONS

Chemical Abstracts, vol. 88, No. 24, Jun. 12, 1978, p. 763, Abstract No. 88:181587g.

*Primary Examiner*—Ronald W. Griffin
*Attorney, Agent, or Firm*—Flynn, Thiel, Boutell & Tanis

[57] ABSTRACT

A nitrocellulose composition in the form of chips containing 50 to 80 wt % of nitrocellulose and less than 1 wt % of water is produced by adding to water-wetted nitrocellulose an organic solvent which dissolves nitrocellulose and polyurethane resin and is inert to isocyanate in an amount of 30 to 300 parts by weight based on 100 parts by weight of dry nitrocellulose, mixing, rolling or extrusion molding, drying at 30° to 55° C., and cutting. This composition is useful as nitrocellulose for magnetic tape binder.

18 Claims, No Drawings

NITROCELLULOSE COMPOSITION AND PROCESS FOR PRODUCING THE SAME

TECHNICAL FIELD

The present invention relates to nitrocellulose chips containing substantially no water and a process for producing the same. More particularly, the present invention relates to nitrocellulose chips suitable for preparing a magnetic tape binder and a process for producing the same.

BACKGROUND ART

At present, the magnetic tape is produced mainly by coating a binder containing magnetic powder onto a plastic film such as polyester and cellulose acetate.

The film-forming material of the magnetic tape binder is selected from polyurethane resin which is crosslinked with an isocyanate compound, a thermoplastic resin such as polyvinyl acetate, polyester, and vinyl chloride-vinyl acetate copolymer, and a mixture thereof. There is disclosed in some known literature that polyurethane resin which is crosslinked with an isocyanate compound is improved in the adhesion and surface hardness when incorporated with nitrocellulose. (Japanese Patent Publication Nos. 6428/1967, 22065/1972, 24522/1973, and 48004/1977)

If water or alcohol as a wetting agent for nitrocellulose is brought into the binder composition, it reacts with isocyanate, impairing the effect of nitrocellulose. Therefore, it is desirable to incorporate the binder with nitrocellulose which contains substantially no water nor alcohol reactive with isocyanate.

A nitrocellulose composition containing no water or alcohol is prepared by replacing water or alcohol with an organic solvent which contains no active hydrogen and does not dissolve nitrocellulose as disclosed in Japanese Patent Publication Nos. 20230/1969 and 9397/1970, or by removing the wetting agent while roll-milling a binder resin for magnetic tapes and nitrocellulose wetted with water or alcohol and then dissolving the resulting resin-nitrocellulose mixture in a solvent inert to isocyanate as disclosed in Japanese Patent Laid-Open No. 142756/1977. These methods still involve problems.

Nitrocellulose wetted with an organic solvent which is inert to isocyanate and does not dissolve nitrocellulose has a disadvantage that the organic solvent is unevenly distributed and is easily charged with electricity because of its low dielectric constant. Thus, it needs care in storage and transportation. Roll-milling with resin requires heating to remove the wetting agent, and this heating discolors nitrocellulose due to thermal decomposition and impairs the working environment with solvent vapors. In addition, some resins stick to the roll, making rolling work difficult with danger and decreasing the operating efficiency.

DISCLOSURE OF INVENTION

In order to overcome the above disadvantages, the present inventors have carried out a series of researches which led to the findings that water disappears selectively from nitrocellulose and an organic solvent remains when nitrocellulose wetted with water is mixed with an organic solvent inert to isocyanate at a certain ratio and the resulting doughlike composition is extruded or rolled into a sheet or string having a large surface area, which is then dried at a comparatively low temperature. The present invention is based on these findings.

The present invention covers a nitrocellulose composition in the form of chips containing 50 to 80 wt% of nitrocellulose and less than 1 wt% of water and a process for producing the same, said process comprising the steps of dissolving nitrocellulose and polyurethane resin in water-wetted nitrocellulose, adding an organic solvent inert to isocyanate in an amount of 30 to 300 parts by weight, preferably 50 to 300 parts by weight, based on 100 parts by weight of dry nitrocellulose, mixing, rolling or extrusion molding, drying at 30° to 55° C., preferably at 30° to 45° C., and cutting.

The nitrocellulose used in this invention is wetted with less than 50 wt% of water and contains nitrogen preferably in an amount of 10.7 to 12.2 wt%.

The organic solvent used in this invention dissolves nitrocellulose and polyurethane resin and does not contain such groups as OH, COOH, and $NH_2$ which are reactive with isocyanate. Examples of such organic solvents include acetate esters such as ethyl acetate, propyl acetate, butyl acetate, and ethylene glycol monomethyl ether acetate; ketones such as methyl ethyl ketone, methyl isobutyl ketone, and cyclohexanone; and lactones such as γ-butyrolactone.

The quantity of the organic solvent to be added varies depending on the quantity of water in the wet nitrocellulose. Wet nitrocellulose usually contains 25 to 30 wt% of water, but water may be added in order to decrease the quantity of the organic solvent to be added. The addition of water brings about a uniform doughlike product. If the organic solvent is added in excess of 300 parts by weight, the resulting doughlike product is too soft and sticky to work efficiently.

The water content in wet nitrocellulose is preferably 25 to 50 wt%, and the quantity of the organic solvent is 30 to 300 parts by weight, preferably 30 to 100 parts by weight.

Wet nitrocellulose may be mixed with an organic solvent by any known method. An apparatus for closed system like a kneader having a powerful mixing force is adequate. The mixing time is 20 to 90 minutes. On mixing with an organic solvent as specified above, water-wetted nitrocellulose turns into a uniform doughlike lump, with water separated on the surface. The doughlike lump obtained in this manner is plastic and can be molded easily by extrusion or rolling. This doughlike lump is advantageously molded into a sheet or string by extrusion or rolling with a die having a cross-section that gives the moldings a large surface area which is useful for removal of water and subsequent dissolution in a solvent. The sheet or string formed in this manner is then dried and cut.

Water tends to separate in the mixing step, and this improves the mixing workability. The mixing workability is further improved if a solvent which is immiscible with water but miscible with a solvent inert to isocyanate is added. Examples of such a solvent include hydrocarbons such as toluene and xylene.

Such a hydrocarbon should have a boiling point from 80° to 150° C., but one having too low a boiling point is not preferable. If this hydrocarbon is added in an excess amount, the resulting chips are easily charged with electricity; thus, it should be added in an amount less than the quantity of the solvent inert to isocyanate.

The sheet or string formed from the doughlike lump should preferably be dried over a long time under moderate conditions. For complete dehydration and drying, it is necessary to consider the time required for water to diffuse from the inside to the surface of chips. Drying at 30° to 55° C. is advisable from the standpoint of safety. The drying time is 10 to 50 hours. In the drying process, the organic solvent and hydrocarbon evaporate, but water evaporates much more selectively in the case of the nitrocellulose composition than in the case of a simple solvent-water mixture. This is considered to be due to the affinity of nitrocellulose and solvent.

The above-mentioned drying step reduces the water content in chips lower than 1 wt%. The chips should preferably contain less than 80 wt% of nitrocellulose from the standpoint of safety. If the chips contain 50 to 80 wt% of nitrocellulose and more than a half of the volatiles is a solvent miscible with nitrocellulose, the chips will not be charged with electricity because such a solvent is usually a polar solvent.

The composition of this invention usually contains less than 1 wt% of water, 50 to 80 wt% of nitrocellulose, with the remainder being organic solvents used at the time of production. It may contain additionally a proper resin as magnetic tape binder.

It is possible to add a resin for magnetic tape binder when the water-wetted nitrocellulose is mixed with the solvent. For instance, nitrocellulose may be mixed with polyurethane resin which can be crosslinked with an isocyanate compound, using a common solvent for the both. If the other resin is not incorporated at the time of production, the nitrocellulose chips obtained in this invention are combined with polyurethane resin and the like to make the magnetic tape binder.

BEST MODE FOR CARRYING OUT THE INVENTION

The invention is described with reference to the following examples, in which "%" and "parts" are by weight.

Example 1

A doughlike product was prepared by mixing for 60 minutes with a kneader 136 parts of nitrocellulose RS ½ wetted with 26% of water and 77 parts of cyclohexanone. The resulting doughlike product was formed into a 2 mm thick sheet using a rolling type sheet extruder and the resulting sheet was dried for 12 hours in a dryer at 40° C.

The dried sheet was cut to chips, about 1 cm by 1 cm, using a guillotine cutter. The volatiles of the chips were found to have the following composition.

| Water | 0.36% |
|---|---|
| Cyclohexanone | 39.04% |

Example 2

Example 1 was repeated except that cyclohexanone was replaced by butyl acetate. The volatiles of the chips were found to have the following composition.

| Water | 0.50% |
|---|---|
| Butyl acetate | 21.50% |

Example 3

A doughlike product was prepared by mixing for 60 minutes with a kneader 100 parts of nitrocellulose RS ½ wetted with 30% of water, 90 parts of methyl ethyl ketone, and 90 parts of toluene. The resulting doughlike product was formed into a 2 mm thick sheet and the resulting sheet was dried for 4 hours in a dryer at 40° C. The dried sheet was cut to chips, about 1 cm by 1 cm, using a guillotine cutter. The volatiles of the chips were found to have the following composition.

| Water | 0.1% or less |
|---|---|
| Methyl ethyl ketone | 13% |
| Toluene | 15% |

Example 4

Example 3 was repeated except that 90 parts of methyl ethyl ketone and 90 parts of toluene were replaced by 85 parts of cyclohexanone and 40 parts of toluene, respectively. The volatiles of the chips were found to have the following composition.

| Water | 0.13% |
|---|---|
| Cyclohexanone | 18% |
| Toluene | 10% |

Example 5

Example 3 was repeated except that 90 parts of methyl ethyl ketone and 90 parts of toluene were replaced by 85 parts of methyl isobutyl ketone and 85 parts of toluene, respectively. The volatiles of the chips were found to have the following composition.

| Water | 0.1% or less |
|---|---|
| Methyl isobutyl ketone | 17% |
| Toluene | 15% |

Example 6

A doughlike product was prepared by mixing for 30 minutes at normal temperature with a twin horizontal kneader 133 parts of nitrocellulose RS ½ wetted with 25% of water, 92 parts (including 59 parts of methyl ethyl ketone) of polyurethane resin (Niporan 2304, made by Nippon Polyurethane) dissolved in methyl ethyl ketone. The resulting doughlike product was formed into a 1 mm to 2 mm thick sheet at normal temperature using a rolling type extruder, and the resulting sheet was dried for 30 hours in a dryer at 40° C.

The dried sheet was cut to chips, about 0.5 cm by 0.5 cm, using a guillotine cutter. The chips were found to have the following composition.

| Water | 0.02% |
|---|---|
| Methyl ethyl ketone | 10.7% |
| Polyurethane resin | 26.7% |
| Nitrocellulose | 62.58% |

Example 7

A doughlike product was prepared by mixing for 60 minutes with a kneader 250 parts of nitrocellulose RS ½ wetted with 40% of water and 46 parts of cyclohexanone. The resulting doughlike product was formed into a 2 mm thick sheet with a rolling type extruder and the resulting sheet was dried for 18 hours in a dryer at 50°

C. The dried sheet was cut to chips, using a rotary cutter. The volatiles of the chips were found to have the following composition.

| Water | 0.3% |
|---|---|
| Cyclohexanone | 29.7% |

What is claimed is:

1. A nitrocellulose composition in the form of chips, which composition consists essentially of from 50 to 80 wt.% of nitrocellulose, less than 1 wt%. of water, and the balance is essentially a member selected from the group consisting of (1) a first organic solvent capable of dissolving nitrocellulose and polyurethane resin but which is nonreactive with isocyanate compounds, (2) a mixture of said first organic solvent with a second organic solvent which is miscible with said first organic solvent but which is immiscible with water, (3) a mixture of (1) and a binder resin for binding magnetic powder to a plastic film to make a magnetic tape, and (4) a mixture of (2) with a binder resin for binding magnetic powder to a plastic film to make a magnetic tape.

2. A nitrocellulose composition as claimed in claim 1, wherein said member is selected from the group consisting of (2) and (4), said first organic solvent is selected from the group consisting of acetate esters, ketones, and lactones, and said second organic solvent is a liquid hydrocarbon having a boiling point in the range of 80° C. to 150° C.

3. A nitrocellulose composition as claimed in claim 2, wherein said first organic solvent is selected from the group consisting of ethyl acetate, propyl acetate, butyl acetate, ethylene glycol monomethyl ether acetate, methyl ethyl ketone, methyl isobutyl ketone, cyclohexanone, and gamma-butyrolactone, and said second organic solvent is toluene or xylene.

4. A nitrocellulose composition as claimed in claim 1, wherein said member is selected from the group consisting of (3) and (4), and said binder resin is polyurethane resin, said first organic solvent is selected from the group consisting of acetate esters, ketones, and lactones, and said second organic solvent is a liquid hydrocarbon having a boiling point in the range of 80° C. to 150° C.

5. A nitrocellulose composition as claimed in claim 4, wherein said first organic solvent is selected from the group consisting of ethyl acetate, propyl acetate, butyl acetate, ethylene glycol monomethyl ether acetate, methyl ethyl ketone, methyl isobutyl ketone, cyclohexanone, and gamma-butyrolactone, and said second organic solvent is toluene or xylene.

6. A nitrocellulose composition as claimed in claim 1, wherein said member is (1), and said first organic solvent is selected from the group consisting of acetate esters, ketones and lactones.

7. A nitrocellulose composition as claimed in claim 6, wherein said first organic solvent is selected from the group consisting of ethyl acetate, propyl acetate, butyl acetate, ethylene glycol monomethyl ether acetate, methyl ethyl ketone, methyl isobutyl ketone, cyclohexanone, and gamma-butyrolactone.

8. A process for producing a nitrocellulose composition in the form of chips, comprising the steps of:
adding from 30 to 300 parts by weight of a first organic solvent to 100 parts of weight, calculated on a dry basis, of water-wetted nitrocellulose, said water-wetted nitrocellulose containing not more than 50 wt.% of water, and said first organic solvent being capable of dissolving nitrocellulose and polyurethane resin but being nonreactive with isocyanate compounds;

mixing together said first organic solvent and said water-wetted nitrocellulose to form a doughlike mass;

molding said mass into a molding having a large surface area;

drying said mass at a temperature in the range of 30° C. to 55° C. to evaporate water from said mass until said mass consists essentially of 50 to 80 wt.% of nitrocellulose, less than 1 wt.% of water, and the balance comprises said first organic solvent; and cutting said mass to form said chips.

9. A process as claimed in claim 8, wherein said first organic solvent is selected from the group consisting of acetate esters, ketones and lactones.

10. A process as claimed in claim 8, wherein said first organic solvent is selected from the group consisting of ethyl acetate, propyl acetate, butyl acetate, ethylene glycol monomethyl ether acetate, methyl ethyl ketone, methyl isobutyl ketone, cyclohexanone and gamma-butyrolactone.

11. A process as claimed in claim 8, wherein said mass is molded by rolling or extrusion molding at normal room temperature to form a sheet or string.

12. A process as claimed in claim 8, wherein said organic solvent and said water-wetted nitrocellulose are mixed with a binder resin for binding magnetic powder to a plastic film to make a magnetic tape, whereby to form said doughlike mass.

13. A process as claimed in claim 12, wherein said binder resin is polyurethane.

14. A process as claimed in claim 8, wherein said first organic solvent and said water-wetted nitrocellulose are mixed with a second organic solvent which is miscible with said first organic solvent but which is immiscible with water, the amount of said second organic solvent being not greater than the amount of said first organic solvent, whereby to form said doughlike mass.

15. A process as claimed in claim 14, wherein said first organic solvent is selected from the group consisting of acetate esters, ketones, and lactones, and said second organic solvent is a liquid hydrocarbon having a boiling point in the range of 80° C. to 150° C.

16. A process as claimed in claim 14, wherein said first solvent is selected from the group consisting of ethyl acetate, propyl acetate, butyl acetate, ethylene glycol monomethyl ether acetate, methyl ethyl ketone, methyl isobutyl ketone, cyclohexanone, and gamma-butyrolactone, and said second solvent is toluene or xylene.

17. A process as claimed in claim 8, wherein the water content of said water-wetted nitrocellulose is 25 to 50 wt.%, and said mixing step is accomplished in a closed system.

18. A process according to claim 8, wherein said water-wetted nitrocellulose contains 25 to 50 wt.% water and contains 10.7 to 12.2 wt.% nitrogen, the amount of said organic solvent is 30 to 100 parts by weight to 100 parts by weight, on a dry basis, of said water-wetted nitrocellulose, said mixing step is carried out in a closed system for 20 to 90 minutes, and said drying step is conducted for 10 to 50 hours.

* * * * *